(12) United States Patent
Kumazaki et al.

(10) Patent No.: US 10,166,974 B2
(45) Date of Patent: Jan. 1, 2019

(54) CONTROL SYSTEM OF POWER TRANSMISSION SYSTEM OF VEHICLE

(71) Applicant: TOYOTA JIDOSHA KABUSHIKI KAISHA, Toyota-shi, Aichi-ken (JP)

(72) Inventors: Kenta Kumazaki, Anjo (JP); Kazuyuki Shiiba, Miyoshi (JP); Tooru Matsubara, Toyota (JP); Nobufusa Kobayashi, Anjo (JP); Masato Yoshikawa, Toyota (JP); Masayuki Baba, Toyota (JP); Shun Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 102 days.

(21) Appl. No.: 15/374,050

(22) Filed: Dec. 9, 2016

(65) Prior Publication Data
US 2017/0166194 A1  Jun. 15, 2017

(30) Foreign Application Priority Data
Dec. 14, 2015  (JP) .................................. 2015-243656

(51) Int. Cl.
*B60W 20/30* (2016.01)
*B60K 6/445* (2007.10)
(Continued)

(52) U.S. Cl.
CPC ............. *B60W 20/30* (2013.01); *B60K 6/365* (2013.01); *B60K 6/445* (2013.01); *B60K 6/547* (2013.01);
(Continued)

(58) Field of Classification Search
CPC .... B60W 20/30; B60W 30/19; B60W 10/192; B60W 10/12; B60W 30/18127;
(Continued)

(56) References Cited

U.S. PATENT DOCUMENTS

2008/0208422 A1* 8/2008 Shibata ................. B60K 6/365
701/54
2008/0254934 A1* 10/2008 Kumazaki ............. B60K 6/365
477/3
(Continued)

FOREIGN PATENT DOCUMENTS

JP  2008-207690 A  9/2008
JP  2011-199959 A  10/2011

*Primary Examiner* — Jeffrey C Boomer
(74) *Attorney, Agent, or Firm* — Oliff PLC (57) ABSTRACT

A control system of a power transmission system of a vehicle is provided. The power transmission system includes an electric motor for running the vehicle, and a mechanical speed change mechanism. The control system includes an electronic control unit. The electronic control unit is configured to: perform regeneration control of the electric motor for running the vehicle during coasting of the vehicle, such that regenerative torque of the electric motor for running the vehicle provides regenerative torque produced according to braking operation; perform shift control of the mechanical speed change mechanism according to a predetermined relationship; determine whether a rate of change of the regenerative torque is within a predetermined range; and when a downshift of the mechanical speed change mechanism is determined during coasting, execute the downshift under a condition that the rate of change of the regenerative torque is within the predetermined range.

5 Claims, 7 Drawing Sheets (51) Int. Cl.

| | | |
|---|---|---|
| *B60W 30/19* | (2012.01) | |
| *B60W 10/192* | (2012.01) | |
| *B60W 10/12* | (2012.01) | |
| *B60W 10/18* | (2012.01) | |
| *B60W 20/14* | (2016.01) | |
| *B60K 6/547* | (2007.10) | |
| *B60W 10/06* | (2006.01) | |
| *B60K 6/365* | (2007.10) | |
| *B60W 10/10* | (2012.01) | |
| *B60W 10/08* | (2006.01) | |
| *B60W 10/115* | (2012.01) | |
| *B60W 30/18* | (2012.01) | |

(52) U.S. Cl.
CPC ............ *B60W 10/06* (2013.01); *B60W 10/08* (2013.01); *B60W 10/10* (2013.01); *B60W 10/115* (2013.01); *B60W 10/12* (2013.01); *B60W 10/192* (2013.01); *B60W 20/14* (2016.01); *B60W 30/18127* (2013.01); *B60W 30/19* (2013.01); *B60W 2510/084* (2013.01); *B60W 2540/10* (2013.01); *B60W 2710/1005* (2013.01); *Y02T 10/6239* (2013.01); *Y02T 10/7258* (2013.01); *Y10S 903/917* (2013.01)

(58) Field of Classification Search
CPC ...... B60W 20/14; B60W 10/06; B60W 10/10; B60W 10/08; B60W 10/115; B60W 2540/10; B60W 2710/1005; B60W 2510/084; B60K 6/445; B60K 6/547; B60K 6/365; Y02T 10/7258; Y02T 10/6239; Y10S 903/917
See application file for complete search history.

(56) References Cited

U.S. PATENT DOCUMENTS

| | | | | |
|---|---|---|---|---|
| 2010/0173745 | A1* | 7/2010 | Hase ........................ | B60K 6/48 477/5 |
| 2012/0077638 | A1* | 3/2012 | Kumazaki .............. | B60K 6/365 477/5 |
| 2013/0210575 | A1* | 8/2013 | Kumazaki ................ | B60K 6/48 477/20 |
| 2013/0296100 | A1* | 11/2013 | Nefcy ................... | B60W 10/08 477/4 |
| 2015/0251657 | A1* | 9/2015 | Johri ........................ | B60L 7/10 701/22 |
| 2015/0283920 | A1* | 10/2015 | Toyota ..................... | B60L 7/14 701/22 |
| 2015/0375747 | A1* | 12/2015 | Shishido ............... | B60W 10/04 701/48 |
| 2017/0008529 | A1* | 1/2017 | Kim ................ | B60W 30/18127 |
| 2017/0197628 | A1* | 7/2017 | Nefcy ..................... | B60K 6/36 |
| 2018/0079418 | A1* | 3/2018 | Iwasa ............. | B60W 30/18127 |
| 2018/0106367 | A1* | 4/2018 | Mouri ..................... | F16H 61/06 |

* cited by examiner

CONTROL SYSTEM OF POWER TRANSMISSION SYSTEM OF VEHICLE

INCORPORATION BY REFERENCE

The disclosure of Japanese Patent Application No. 2015-243656 filed on Dec. 14, 2015 including the specification, drawings and abstract is incorporated herein by reference in its entirety.

BACKGROUND

1. Technical Field

The present disclosure relates to a control system of a power transmission system of a vehicle including an electric motor for running the vehicle, which motor is coupled to an input rotating member of a mechanical speed change mechanism such that power can be transmitted between the electric motor and the speed change mechanism.

2. Description of Related Art

A control system of a power transmission system of a vehicle including an electric motor for running the vehicle, and a mechanical speed change mechanism that provides a part of a power transmission path between the electric motor and drive wheels, is well known in the art. For example, a control system of a vehicular drive unit described in Japanese Patent Application Publication No. 2008-207690 (JP 2008-207690 A) is one example of the known system. Regarding the control system of the power transmission system, various proposals have been made to reduce variation or fluctuation in output torque at the time of shifting of the mechanical speed change mechanism so as to reduce shift shock. As disclosed in JP 2008-207690 A, when the mechanical speed change mechanism is shifted down at the time of regeneration by the electric motor for running the vehicle during coasting of the vehicle, regenerative torque of the motor is reduced during an inertia phase in the course of downshifting, so that shift shock is reduced. Also, it is known to perform torque control of the electric motor for running the vehicle during a torque phase in the course of shifting of the mechanical speed change mechanism (namely, perform torque phase compensation control by means of the motor for running the vehicle), so as to suppress or reduce variation in output torque generated during the torque phase, and thus reduce shift shock.

SUMMARY

Generally, in the control system of the power transmission system of the vehicle as described above, regenerative torque applied to the electric motor for running the vehicle during coasting of the vehicle is made larger in the presence of braking operation performed by the driver ("brake-on") than that in the absence of braking operation ("brake-off"), or the regenerative torque is increased as the braking operation amount is larger at the time of "brake-on". Therefore, a downshift of the mechanical speed change mechanism during coasting and increase of regenerative torque caused by braking operation may take place at the same time. In this case, the regenerative torque is increased, and it becomes difficult to reduce regenerative torque of the motor for running the vehicle during the inertia phase of downshift of the mechanical speed change mechanism, which may result in deterioration of shift shock. If control for reducing shift shock is performed during downshifting of the mechanical speed change mechanism, regenerative torque, which should be increased based on braking operation of the driver, is reduced, and it becomes difficult to control the regenerative torque. As a result, shift shock may not be appropriately reduced.

The present disclosure is to provide a control system of a power transmission system of a vehicle, which is able to curb deterioration of shift shock, when a downshift of a mechanical speed change mechanism during coasting and increase of regenerative torque caused by braking operation take place at the same time.

A control system of a power transmission system of a vehicle is provided according to one aspect of the present disclosure. The power transmission system includes an electric motor for running the vehicle, and a mechanical speed change mechanism. The mechanical speed change mechanism provides a part of a power transmission path between the electric motor for running the vehicle and drive wheels. The control system includes an electronic control unit. The electronic control unit is configured to: (i) perform regeneration control of the electric motor for running the vehicle during a coasting of the vehicle, such that regenerative torque of the electric motor for running the vehicle provides regenerative torque produced according to braking operation; (ii) perform shift control of the mechanical speed change mechanism according to a predetermined relationship; (iii) determine whether a rate of change of the regenerative torque is within a predetermined range; and (iv) when a downshift of the mechanical speed change mechanism is determined by the electronic control unit during the coasting, execute the downshift under a condition that the electronic control unit determines that the rate of change of the regenerative torque is within the predetermined range.

With the control system of the power transmission system of the vehicle according to the above aspect of the present disclosure, when a downshift of the mechanical speed change mechanism is determined during coasting, the downshift is carried out under a condition that the rate of change of regenerative torque is within the predetermined range. Thus, the downshift is carried out in a stable condition in which change of the regenerative torque is small. Accordingly, when a downshift of the mechanical speed change mechanism during coasting and increase of regenerative torque caused by braking operation take place at the same time, otherwise possible deterioration of shift shock can be curbed.

In the control system of the power transmission system of the vehicle according to the above aspect of the present disclosure, the electronic control unit may be configured to, when the electronic control unit determines that the rate of change of the regenerative torque is not within the predetermined range and when a downshift of the mechanical speed change mechanism is determined by the electronic control unit during the coasting, not to execute the downshift until the electronic control unit determines that the rate of change of the regenerative torque is within the predetermined range.

With the control system of the power transmission system of the vehicle as described above, if the rate of change of regenerative torque is not within the predetermined range when a downshift of the mechanical speed change mechanism is determined during coasting, the downshift is not carried out until the rate of change of regenerative torque falls within the predetermined range. Thus, the downshift is not carried out in a condition where change of the regenerative torque is large, and deterioration of shift shock is curbed.

In the control system of the power transmission system of the vehicle according to the above aspect of the present disclosure, the regenerative torque produced according to the braking operation may be a requested regenerative torque that is increased as a braking operation amount is larger, and the rate of change of the regenerative torque may be a rate of change of the requested regenerative torque.

In the control system of the power transmission system of the vehicle as described above, the regenerative torque produced according to braking operation is the requested regenerative torque that is increased as the braking operation amount is larger, and the rate of change of the regenerative torque is the rate of change of the requested regenerative torque. Therefore, while the requested regenerative torque is increasing such that the rate of change of the requested regenerative torque is not within the predetermined range, no downshift of the mechanical speed change mechanism is carried out. Accordingly, since there is no need to execute control for reducing shift shock while the requested regenerative torque is increasing, the actual regenerative torque that meets or follows the requested regenerative torque can be easily obtained. As a result, regenerative energy is less likely or unlikely to be reduced.

In the control system of the power transmission system of the vehicle as described above, the mechanical speed change mechanism may be an automatic transmission that is configured to be shifted into a selected gear position of a plurality of gear positions, through engagement and release of at least one engagement device.

In the control system of the power transmission system of the vehicle as described above, the mechanical speed change mechanism is the automatic transmission that is shifted into a selected one of a plurality of gear positions through engagement and release of engagement devices. Therefore, a downshift of the automatic transmission is carried out in a stable condition in which change of regenerative torque is small.

In the control system of the power transmission system of the vehicle as described above, the predetermined range may be determined in advance for each gear position of the automatic transmission.

In the control system of the power transmission system of the vehicle as described above, the predetermined range is determined in advance for each gear position of the automatic transmission. Therefore, when the degree of occurrence of shift shock differs depending on the gear position of the automatic transmission, a downshift of the automatic transmission is carried out in accordance with the degree of occurrence. Namely, if a downshift is not carried out even though shift shock is unlikely to occur, completion of the downshift may be delayed. If a downshift is executed even though shift shock is likely to occur, the shock may deteriorate. With the control system as described above, the delay in completion of the downshift, or deterioration of the shock, is less likely or unlikely to occur.

In the control system of the power transmission system of the vehicle according to the above aspect of the present disclosure, the power transmission system may further include an electric speed change mechanism. The electric speed change mechanism includes a differential mechanism and an electric motor for differential operation. The differential mechanism may be coupled to an engine such that power is transmitted between the differential mechanism and the engine. The electric motor for differential operation may be coupled to the differential mechanism such that power is transmitted between the electric motor for differential operation and the differential mechanism. The electronic control unit may be configured to control an operating state of the electric motor for differential operation so as to control a differential state of the differential mechanism. The electric motor for running the vehicle may be coupled to an output rotating member of the electric speed change mechanism such that power is transmitted between the electric motor for running the vehicle and the output rotating member. An input rotating member of the mechanical speed change mechanism may be coupled to the output rotating member of the electric speed change mechanism.

With the control system of the power transmission system of the vehicle as described above, in which the electric speed change mechanism and the mechanical speed change mechanism are arranged in series, when a downshift of the mechanical speed change mechanism during coasting and increase of regenerative torque caused by braking operation take place at the same time, deterioration of shift shock can be curbed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

One embodiment of the present disclosure will be described in detail with reference to the drawings.

Figure 1:
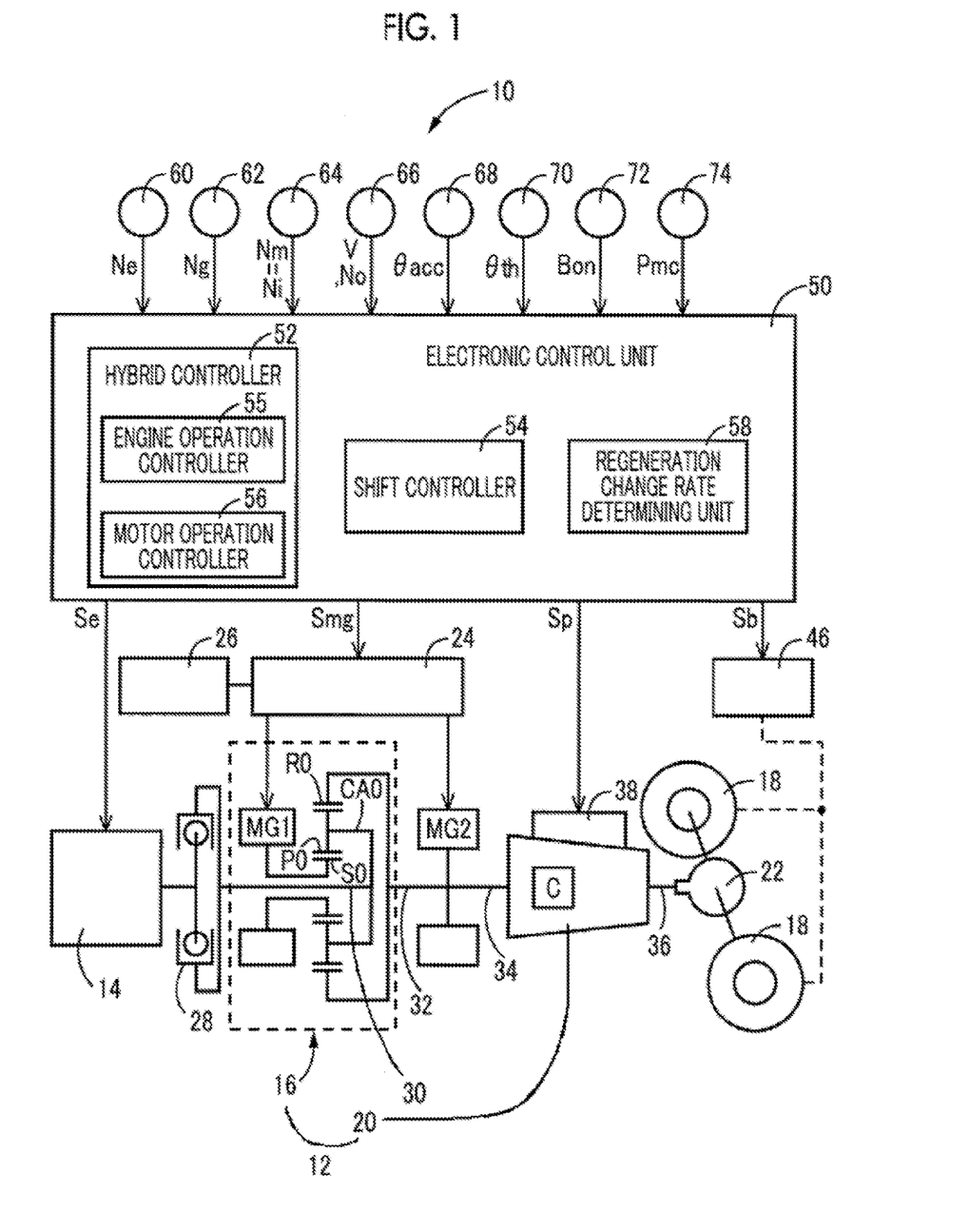
FIG. 1 is a view schematically showing the configuration of a power transmission system included in a vehicle to which the present disclosure is applied, and is also a view useful for explaining control functions and a principal part of a control system for various controls in the vehicle.

FIG. 1 schematically shows the configuration of a power transmission system 12 provided in a vehicle 10 to which this present disclosure is applied, and is also useful for explaining a principal part of a control system for various controls performed in the vehicle 10. In FIG. 1, the vehicle 10 is a hybrid vehicle including an engine 14, a first motor MG1, and a second motor MG2. The power transmission system 12 includes a power distribution mechanism 16, and an automatic transmission (AT) 20 disposed between the power distribution mechanism 16 and drive wheels 18. The power distribution mechanism 16 has a plurality of rotating elements (rotating members) to which the engine 14, first motor MG1, and the second motor MG2 are respectively coupled such that power can be transmitted between the engine 14, first motor MG1 and second motor MG2, and the corresponding rotating elements. In the power transmission system 12, power (which is synonymous with torque or force where they are not particularly distinguished from each other) generated from the engine 14 or the second motor MG2 is transmitted to the automatic transmission 20, and then transmitted from the automatic transmission 20 to the drive wheels 18 via a differential gear device 22, etc.

The engine 14 is a main power source of the vehicle 10, and is a known internal combustion engine, such as a gasoline engine or a diesel engine. Operating conditions, such as a throttle opening θth or intake air amount, fuel supply amount, and ignition timing, of the engine 14 are controlled by an electronic control unit 50 that will be described later, so that engine torque Te is controlled.

The first motor MG1 and the second motor MG2 are motor-generators having a function as a motor and a function as a generator, and are selectively operated as a motor or a generator. Each of the first motor MG1 and the second motor MG2 is connected to a battery 26 included in the power transmission system 12, via an inverter 24 included in the power transmission system 12. With the inverter 24 controlled by the electronic control unit 50 that will be described later, MG1 torque Tg and MG2 torque Tm as output torque (or regenerative torque) of each of the first motor MG1 and the second motor MG2 are controlled. The battery 26 is a power storage device that supplies and receives electric power to and from each of the first motor MG1 and the second motor MG2.

The power distribution mechanism 16 is in the form of a known single-pinion-type planetary gear set having three rotating elements, i.e., a sun gear S0, a ring gear R0 disposed concentrically with the sun gear S0, and a carrier CA0 that supports pinion gears P0 that mesh with the sun gear S0 and the ring gear R0 such that the pinion gears P0 can rotate about themselves and rotate about the axis of the gear set. The power distribution mechanism 16 functions as a differential mechanism that performs differential operation. In the power transmission system 12, the engine 14 is coupled to the carrier CA0 via a damper 28 such that power can be transmitted between the engine 14 and the carrier CA0, and the first motor MG1 is coupled to the sun gear S0 such that power can be transmitted between the first motor MG1 and the sun gear S0, while the second motor MG2 is coupled to the ring gear R0 such that power can be transmitted between the second motor MG2 and the ring gear R0. In the power distribution mechanism 16, the carrier CA0 functions as an input element, and the sun gear S0 functions as a reaction-force element, while the ring gear R0 functions as an output element.

The power distribution mechanism 16 has three rotating elements, i.e., the carrier CA0 to which the engine 14 is operatively coupled, the sun gear S0 to which the first motor MG1 as an electric motor for differential operation is operatively coupled, and the ring gear R0 to which the second motor MG2 as an electric motor for running the vehicle is operatively coupled. Namely, the power transmission system 12 has the power distribution mechanism 16 operatively coupled to the engine 14, and the first motor MG1 operatively coupled to the power distribution mechanism 16. In the power transmission system 12, an electric continuously variable transmission 30 as an electric speed change mechanism (electric differential mechanism) is constructed in which an operating state of the first motor MG1 is controlled so that a differential status of the power distribution mechanism 16 is controlled. The electric continuously variable transmission 30 is operable to change the speed ratio γ0 (=engine speed Ne/MG2 rotational speed Nm).

The automatic transmission 20 is a mechanical speed change mechanism that provides a part of a power transmission path between a transmission member 32 as an output rotating member of the electric continuously variable transmission 30, and the drive wheels 18. The transmission member 32 is coupled integrally with the ring gear R0, and is also coupled integrally with a transmission input shaft (AT input shaft) 34 as an input rotating member of the automatic transmission 20. The second motor MG2 is coupled to the transmission member 32 such that power can be transmitted between the second motor MG2 and the transmission member 32. Accordingly, the automatic transmission 20 is a mechanical speed change mechanism that provides a part of a power transmission path between the second motor MG2 and the drive wheels 18.

The automatic transmission 20 is a known planetary gear type automatic transmission that has two or more planetary gear sets and two or more engagement devices, for example. The automatic transmission 20 performs so-called clutch-to-clutch shifting by engaging and releasing selected ones of the two or more engagement devices (namely, by switching engaged and released states of the engagement devices). Namely, the automatic transmission 20 is a mechanical speed change mechanism that changes the speed ratio through engagement and release of the engagement devices, so as to form a selected one of two or more gear positions having difference speed ratios (gear ratios) γat (=AT input rotational speed Ni/AT output rotational speed No).

The above-mentioned two or more engagement devices are hydraulic friction devices that transmit rotation and torque between the transmission input shaft 34 that receives power from the engine 14 and the second motor MG2, and the transmission output shaft (AT output shaft) 36 as an output rotating member of the automatic transmission 20 that transmits power to the drive wheels 18. The torque capacity (clutch torque) of each of the engagement devices is changed by regulating the engaging hydraulic pressure (clutch pressure) by means of a solenoid valve, or the like, in a hydraulic control circuit 38 included in the automatic transmission 20, so that engagement and release of the engagement device are controlled. In this embodiment, the two or more engagement devices will be called "clutches C", for the sake of convenience, but the clutches C include known brakes, etc., as well as clutches.

Figure 2:
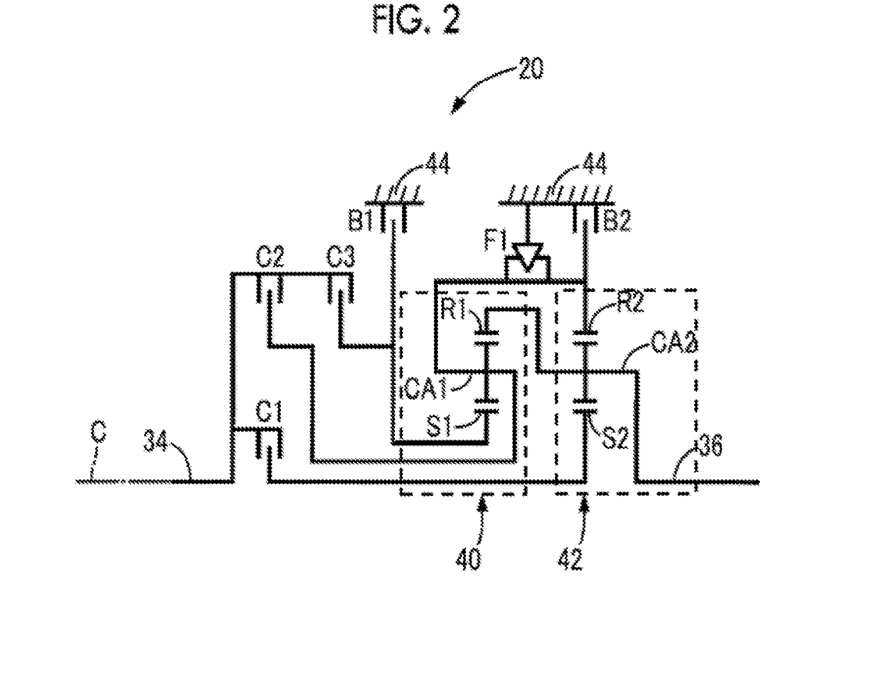
FIG. 2 is a skeleton diagram illustrating one example of an automatic transmission.
Figure 3:
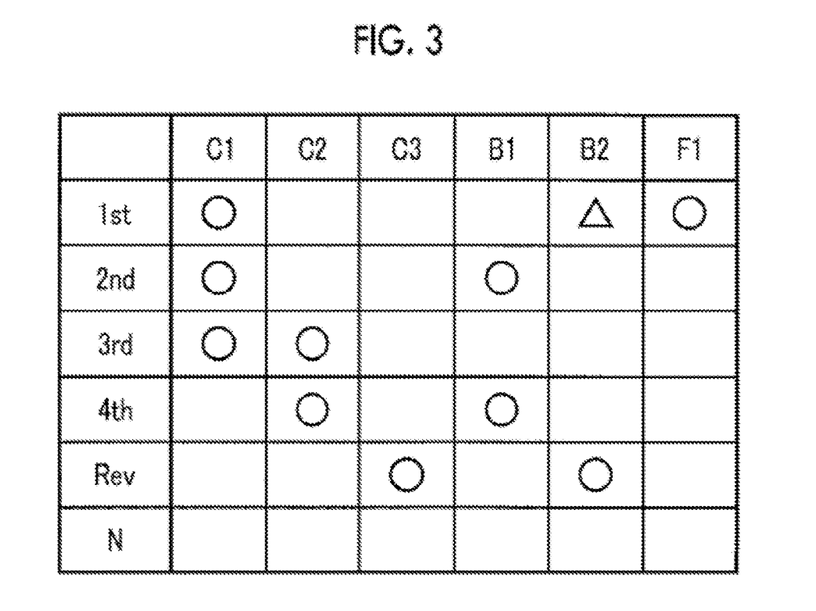
FIG. 3 is an operation table explaining the relationship between shift operation of the automatic transmission illustrated in FIG. 2, and a combination of operating states of engagement devices used in shift operation.

FIG. 2 is a skeleton diagram that illustrates one example of the automatic transmission 20. The automatic transmission 20 is constructed generally symmetrically with respect to the axis C of the transmission input shaft 34, and the lower half of the automatic transmission 20 below the axis C is not illustrated in FIG. 2. In FIG. 2, the automatic transmission 20 includes a first planetary gear set 40 and a second planetary gear set 42 having rotational elements (sun gears S1, S2, carriers CA1, CA2, and ring gears R1, R2). Each of the rotating elements of the first and second planetary gear sets 40, 42 is coupled to another rotating element, or coupled to the transmission input shaft 34, a case 44 as a non-rotating member, or the transmission output shaft 36, directly or indirectly (or selectively) via a clutch C (clutch C1, C2, C3, or brake B1, B2) or a one-way clutch F1. The automatic transmission 20 is placed in a selected one of four forward gear positions, reverse gear position, and a neutral condition, as indicated in an engagement operation table of FIG. 3, through engagement/release control of each of the clutches C. In FIG. 3, "1st" through "4th" indicate the first-speed gear position through fourth-speed gear position as forward gear positions, and "Rev" indicates the reverse gear position, while "N" indicates the neutral condition. The engagement operation table of FIG. 3 shows the relationship between each of the above-indicated gear positions and respective operating states of the clutches C. In FIG. 3, "○" indicates engaged state, and "Δ" indicates engaged state when engine brake is applied, while blank indicates released state. Since the one-way clutch F1 is provided in parallel with the brake B2 that establishes the first-speed gear position "1st", there is no need to engage the brake B2 when the vehicle is started (accelerated).

The power transmission path in the automatic transmission 20 is switched between a power transmittable state in which power can be transmitted through the power transmission path, and a power-transmission blocked state in which power transmission is blocked or interrupted, depending on a combination of engaged and released states of the clutches C. Namely, in the automatic transmission 20, the power transmission path is placed in the power transmittable state when any of the gear positions, i.e., the first-speed gear position through the fourth-speed gear position, and the reverse gear position, is established, and the power transmission path is placed in the power-transmission blocked state when none of the gear positions is established (i.e., when the neutral condition is established).

In the power transmission system 12, the automatic transmission 20 that functions as a stepped speed-change transmission is coupled in series to the downstream end of the electric continuously variable transmission 30 that functions as a continuously variable transmission, and the electric continuously variable transmission 30 and the automatic transmission 20 constitute a continuously variable transmission as a whole.

Figure 4:
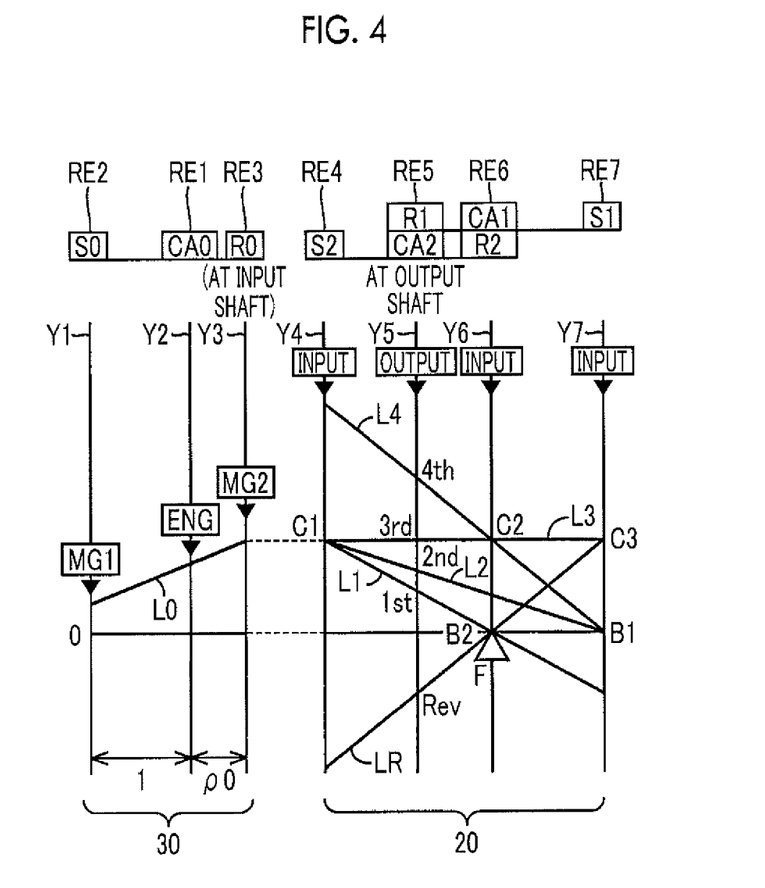
FIG. 4 is a nomographic chart showing one example of relative relationships among rotational speeds of respective rotating elements in an electric continuously variable transmission and the automatic transmission.

FIG. 4 is a nomographic chart indicating relative relationships of rotational speeds of respective rotating elements in the electric continuously variable transmission 30 and the automatic transmission 20. In FIG. 4, three vertical lines Y1, Y2, Y3 corresponding to three rotating elements of the power distribution mechanism 16 that constitutes the electric continuously variable transmission 30 represent the rotational speed of the sun gear S0 corresponding to a second rotating element RE2, the rotational speed of the carrier CA0 corresponding to a first rotating element RE1, and the rotational speed of the ring gear R0 corresponding to a third rotating element RE3 (namely, the rotational speed of the transmission input shaft 34), respectively. Also, four vertical lines Y4, Y5, Y6, Y7 of the automatic transmission 20 represent the rotational speed of the sun gear S2 corresponding to a fourth rotating element RE4, the rotational speed of the mutually coupled ring gear R1 and carrier CA2 corresponding to a fifth rotating element RE5 (namely, the rotational speed of the transmission output shaft 36), the rotational speed of the mutually coupled carrier CA1 and ring gear R2 corresponding to a sixth rotating element RE6, and the rotational speed of the sun gear S1 corresponding to a seventh rotating element RE7, respectively. The intervals between adjacent ones of the vertical lines Y1, Y2, Y3 are determined according to the gear ratio $\rho 0$ of the power distribution mechanism 16. Also, the intervals between adjacent ones of the vertical lines Y4, Y5, Y6, Y7 are determined according to the respective gear ratios $\rho 1$, $\rho 2$ of the first and second planetary gear sets 40, 42. Regarding the relationship of the intervals between the vertical axes in the nomographic chart, where the interval between the sun gear and the carrier is regarded as an interval corresponding to "1", the interval between the carrier and the ring gear is regarded as an interval corresponding to the gear ratio $\rho$ (=the number of teeth Zs of the sun gear/the number of teeth Zr of the ring gear) of the planetary gear set.

Referring to the nomographic chart of FIG. 4, in the power distribution mechanism 16 of the electric continuously variable transmission 30, the first rotating element RE1 is coupled to the engine 14, and the second rotating element RE2 is coupled to the first motor MG1, while the third rotating element RE3 is coupled to the transmission member 32 and the second motor MG2, such that rotation of the engine 14 is transmitted to the automatic transmission 20 via the transmission member 32. In the electric continuously variable transmission 30, the relationship between the rotational speed of the sun gear S0 and the rotational speed of the ring gear R0 is indicated by a straight line L0 that crosses the vertical line Y2.

Also, in the automatic transmission 20, the fourth rotating element RE4 is selectively coupled to the transmission member 32 via a clutch C1, and the fifth rotating element RE5 is coupled to the transmission output shaft 36, while the sixth rotating element RE6 is selectively coupled to the transmission member 32 via a clutch C2, and is also selectively coupled to the case 44 via the brake B2, and the seventh rotating element RE7 is selectively coupled to the transmission member 32 via a clutch C3, and is also selectively coupled to the case 44 via a brake B1. In the automatic transmission 20, the respective rotational speeds of the transmission output shaft 36 in the "1st", "2nd", "3rd", "4th", and "Re" positions are indicated by respective straight lines L1, L2, L3, L4, LR when crossing the vertical line Y5 under the engagement/release control of the clutches C.

FIG. 4 shows the relative speeds of the respective rotating elements in a hybrid traveling mode in which the vehicle can travel using at least the engine 14 as a drive source. In the hybrid traveling mode, if reaction-force torque as negative torque produced by the first motor MG1 is applied as positive rotation to the sun gear S0, against engine torque Te received by the carrier CA0, in the power distribution mechanism 16, engine directly-reached torque Td (=Te/(1+ $\rho$))=−(1/$\rho$)×Tg) that provides positive torque appears as positive rotation on the ring gear R0. Then, according to the required driving force, the total or combined torque of the engine directly-reached torque Td and the MG2 torque Tm is transmitted as driving force in the vehicle forward direction to the drive wheels 18 via the automatic transmission 20. At this time, the first motor MG1 functions as a generator that generates negative torque when it is rotated positively. The electric power Wg generated by the first motor MG1 is charged into the battery 26, or consumed by the second motor MG2. The second motor MG2 delivers MG2 torque Tm, using the whole or a part of the generated electric power Wg, or using electric power from the battery 26 in addition to the generated electric power Wg. In the hybrid traveling mode, if the rotational speed of the sun gear S0 is increased or reduced by controlling the rotational speed of the first motor MG1, relative to the rotational speed of the ring gear R0 which is restricted by rotation of the drive wheels 18, the rotational speed of the carrier CA0, or the engine speed Ne, is increased or reduced. Accordingly, when the vehicle is traveling with power from the engine, the engine 14 can be operated at a highly efficient operating point.

Although not illustrated in the drawings, in a nomographic chart for a motor traveling mode in which the vehicle travels using the second motor MG2 as a drive source with the engine 14 stopped, the carrier CA0 is not rotated (i.e., rotated at zero speed), and the MG2 torque Tm that provides positive torque is applied as positive rotation to the ring gear R0. At this time, the first motor MG1 coupled to the sun gear S0 is placed in a no-load condition and is rotated at idle in negative direction. Namely, in the motor traveling mode, the engine 14 is not driven, and the engine speed Ne is equal to zero, while the MG2 torque Tm (here, power running torque of positive rotation) is transmitted as driving force in vehicle forward direction to the drive wheels 18 via the automatic transmission 20.

Referring back to FIG. 1, the vehicle 10 includes a wheel brake system 46 as a braking system that applies wheel brake torque (braking torque) to wheels (drive wheels 18, and driven wheels (not shown)). The wheel brake system 46 supplies brake hydraulic pressures (braking pressures) to wheel cylinders provided in wheel brakes, according to braking operation (e.g., brake pedal operation) performed by the driver. In normal operation of the wheel brake system 46, a brake fluid pressure (master cylinder pressure) Pmc that is generated from a brake master cylinder, with a magnitude corresponding to the brake pedal force (force on the brake pedal), is directly supplied to the wheel cylinders as the braking pressure. In the meantime, braking force coordination control, ABS control, traction control, VSC control, and hill hold control may be performed as needed, for example. When any of these controls is carried out, braking pressures needed for each control are supplied to the wheel cylinders, in addition to the braking pressures corresponding to the brake pedal force, so as to generate wheel brake torque that will be replaced by regeneration torque during deceleration (coasting), brake, start or turn the vehicle 10 on a low μ road, or keep the vehicle stopped on a hill.

The vehicle 10 has the electronic control unit 50 including a control system of the power transmission system 12, for example. FIG. 1 shows an input/output system of the electronic control unit 50, and is also a functional block diagram useful for explaining a principal part of control functions performed by the electronic control unit 50. The electronic control unit 50 includes a so-called microcomputer having CPU, RAM, ROM, input/output interface, etc., and performs various controls of the vehicle 10, by conducting signal processing according to programs stored in advance in the ROM, while utilizing the temporary storage function of the RAM. For example, the electronic control unit 50 performs output control of the engine 14, output control, including regeneration control, of each of the first motor MG1 and the second motor MG2, shift control of the automatic transmission 20, and so forth, and is configured to be divided into sub-units for engine control, motor control, hydraulic control (shift control), etc., as needed.

The electronic control unit 50 is supplied with various actual values based on detection signals detected by various sensors included in the vehicle 10. The sensors include, for example, an engine speed sensor 60, motor speed sensors 62, 64, such as resolvers, vehicle speed sensor 66, accelerator pedal position sensor 68, throttle opening sensor 70, brake switch 72, and a master cylinder pressure sensor 74. The above-mentioned actual values include, for example, an engine speed Ne as the rotational speed of the engine 14, MG1 rotational speed Ng as the rotational speed of the first motor MG1, MG2 rotational speed Nm as the rotational speed of the second motor MG2 corresponding to an AT input rotational speed Ni as the rotational speed of the transmission input shaft 34, AT output rotational speed No as the rotational speed of the transmission output shaft 36 corresponding to the vehicle speed V, accelerator pedal stroke θacc as the operation amount of the accelerator pedal representing the amount of acceleration requested by the driver, throttle opening θth as the opening of an electronic throttle valve, brake-on Bon as a signal indicating a condition (brake operated condition) in which the driver operates the brake pedal so as to activate wheel brakes, and a master cylinder pressure Pmc generated from the brake master cylinder. Also, the electronic control unit 50 generates an engine output control command signal Se for output control of the engine 14, motor control command signal Smg for operating the inverter 24 that controls the first motor MG1 and the second motor MG2, hydraulic control command signal Sp for controlling the clutch(es) C associated with shifting of the automatic transmission 20, brake control command signal Sb for operating the wheel brake system 46, and so forth. The hydraulic control command signal Sp is, for example, a command signal (hydraulic command value) for driving each solenoid valve that regulates each clutch pressure supplied to a hydraulic actuator of each of the clutches C. The hydraulic control command signal Sp is generated to the hydraulic control circuit 38.

The electronic control unit 50 includes a hybrid control means or hybrid controller 52, and a shift control means or shift controller 54.

The hybrid controller 52 has a function as an engine operation control means or engine operation controller 55 for controlling operation of the engine 14, and a function as a motor operation control means or motor operation controller 56 for controlling operation of the first motor MG1 and the second motor MG2 via the inverter 24. The hybrid controller 52 performs hybrid drive control, etc. on the engine 14, first motor MG1, and the second motor MG2, using these control functions. More specifically, the hybrid controller 52 calculates the required driving force Fdem by applying the accelerator pedal stroke θacc and the vehicle speed V to a predetermined relationship (e.g, driving force map) that is empirically or theoretically obtained and stored in advance. The hybrid controller 52 outputs command signals (engine output control command signal Se and motor control command signal Smg) for controlling the engine 14, first motor MG1, and the second motor MG2, so as to obtain the required driving force Fdem, in view of the engine optimum fuel efficiency point, transmission loss, accessory load, gear ratio γat of the automatic transmission 20, chargeable/dischargeable electric power Win, Wout of the battery 26, and so forth. As a result of the control, the speed ratio γ0 of the electric continuously variable transmission 30 is controlled.

The motor operation controller 56 performs regeneration control of the second motor MG2 so that regenerative torque requested according to braking operation can be obtained, during coasting of the vehicle 10 with the accelerator pedal released. Under the regeneration control, the second motor MG2 is rotated/driven with driven torque applied from the drive wheels 18, to operate as a generator, and electric power thus generated is charged into the battery 26 via the inverter 24.

During coasting of the vehicle 10, the hybrid controller 52 sets a target deceleration Gtgt, and generates braking torque of the vehicle 10 so as to obtain the target deceleration Gtgt. The hybrid controller 52 calculates the target deceleration Gtgt by applying the master cylinder pressure Pmc to a relationship that is predetermined so that the target deceleration Gtgt becomes larger as the master cylinder pressure Pmc corresponding to the braking operation amount is larger. While the braking torque of the vehicle 10 is obtained from regenerative torque, engine brake torque, wheel brake torque, etc., the highest priority is placed on the regenerative torque, in view of the energy efficiency. The hybrid controller 52 calculates requested regenerative torque with which the target deceleration Gtgt is obtained, according to a predetermined relationship. Accordingly, the requested regenerative torque is increased as the braking operation amount is larger. The motor operation controller 56 performs regeneration by the second motor MG2, so that the requested regenerative torque is obtained.

To achieve the target deceleration Gtgt through regeneration during coasting of the vehicle 10, the hybrid controller 52 stops the engine 14 through fuel-cut, and places the first motor MG1 in a no-load condition to rotate it at idle, so that the engine speed Ne is kept equal to or substantially equal to zero. With this arrangement, pumping loss is less likely or unlikely to be generated due to dragging (resistance to rotation) of the engine 14, resulting in reduction of the deceleration and increase of the regeneration amount. When regeneration by the second motor MG2 is restricted due to restriction on charge of the battery 26, braking torque is obtained from engine brake torque, wheel brake torque, or the like, in place of a part or the whole of the regenerative torque.

The shift controller 54 performs shift control of the automatic transmission 20, so as to obtain the required driving force Fdem, in coordination with control of the engine 14, first motor MG1, second motor MG2, and the speed ratio γ0 of the electric continuously variable transmission 30, performed by the hybrid controller 52. More specifically, the shift controller 54 determines whether the automatic transmission 20 should be shifted up or down to a certain gear position, according to a predetermined relationship (shift map). When the shift controller 54 determines that the automatic transmission 20 should be shifted up or down to a certain gear position, it performs shift control of the automatic transmission 20, by generating a hydraulic control command signal Sp for engaging and/or releasing the clutch(es) C associated with shifting of the automatic transmission 20, to the hydraulic control circuit 38, so as to form the gear position determined.

Figure 5:
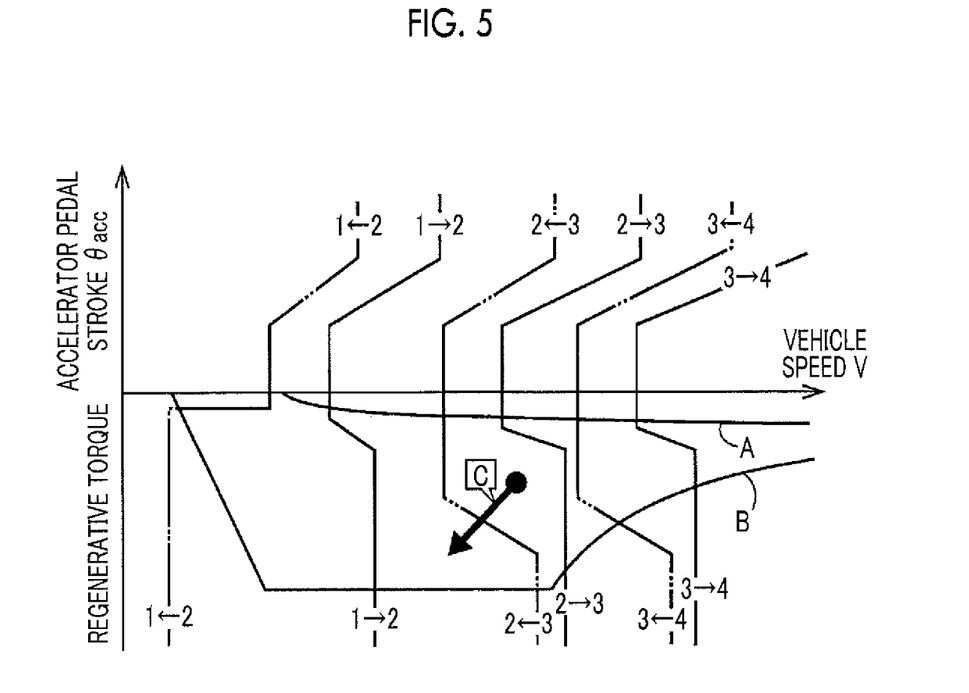
FIG. 5 is a view showing one example of shift map used in shift control of the automatic transmission.

FIG. 5 shows one example of the shift map. As shown in FIG. 5, the shift map indicates certain relationships having shift lines used for determining whether the automatic transmission 20 is to be shifted up or down, on a two-dimensional coordinate system having the vehicle speed V (equivalent to the AT output rotational speed No, or the like) and the accelerator pedal stroke θacc (equivalent to the required driving force Fdem, throttle opening θth, or the like) as variables, for example, when the vehicle 10 is in a driving state. Also, the shift map indicates certain relationships having shift lines used for determining whether the automatic transmission 20 is to be shifted up or down, on a two-dimensional coordinate system having the vehicle speed V and the regenerative torque (equivalent to the output torque of the automatic transmission 20 (which will be called "AT output torque To")) as variables, for example, when the vehicle 10 is in a driven state (namely, when the vehicle 10 is in a coasting state). The shift lines in the shift map include upshift lines (indicated by solid lines) used for determining upshift, and downshift lines (indicated by two-dot chain lines) used for determining downshift. Each of the shift lines is used for determining whether the vehicle speed V has crossed any line on a line indicating a certain accelerator pedal stroke θacc or regenerative torque, or whether the accelerator pedal stroke θacc or requested regenerative torque has crossed any line on a line indicating a certain vehicle speed V, namely, whether a parameter has crossed a value (shift point) at which the automatic transmission 20 should be shifted up or down, on any shift line. Thus, each of the shift lines is determined in advance as a collection of successive shift points. In FIG. 5, solid line A indicates regenerative torque generated when braking operation is not performed and the brake pedal is released during coasting of the vehicle 10, and solid line B indicates the maximum regenerative torque generated when braking operation is performed and the brake pedal is depressed during coasting of the vehicle 10.

In the automatic transmission 20 that performs clutch-to-clutch shifting, a temporary reduction (fall) appears in the AT output torque To in a torque phase during shifting, and the driver may sense the fall of the AT output torque To as a shock at the time of shifting, and may feel strange or uncomfortable. On the other hand, the motor operation controller 56 performs torque phase compensation control for making torque compensation, using the MG2 torque Tm, so as to reduce the fall of the AT output torque To. The torque phase compensation control is performed when the automatic transmission 20 is shifted up during acceleration of the vehicle 10, or when the automatic transmission 20 is shifted down during coasting of the vehicle 10. When braking torque during coasting is generated in the form of regenerative torque, the regenerative torque is temporarily reduced by the motor operation controller 56, in the torque phase during shifting of the automatic transmission 20. In this connection, the regenerative torque is negative torque produced when the second motor MG2 makes positive rotation; thus, the statement that the regenerative torque is large means that the absolute value of the regenerative torque is large, and the statement that the regenerative torque is reduced means that the absolute value of the regenerative torque is reduced, and the value of the regenerative torque becomes closer to zero.

As indicated by arrow C in FIG. 5, when the requested regenerative torque is increased according to braking operation, during coasting of the vehicle 10, it may be determined that the automatic transmission 20 is should be shifted down. In this case, the regenerative torque is increased, and it becomes difficult to reduce the regenerative torque of the second motor MG2 during the inertia phase of downshift of the automatic transmission 20, which may result in deterioration of shock at the time of shifting. Also, when the torque phase compensation control for reducing shift shock during downshifting of the automatic transmission 20, the regenerative torque that should be increased based on braking operation of the driver is reduced; therefore, it may be difficult to perform the torque phase compensation control, and shift shock may not be appropriately reduced.

When downshift of the automatic transmission 20 during coasting and increase of regenerative torque according to braking operation take place at the same time, it may be considered that deterioration of shift shock can be curbed, if the automatic transmission 20 is shifted down in a condition where the regenerative torque is in a stable state, namely, where the regenerative torque is substantially constant, or variation in the regenerative torque is small. On the basis of this point of view, the electronic control unit 50 executes downshift of the automatic transmission 20 while regenerative torque is in a stable state, when downshift of the automatic transmission 20 during coasting and increase of regenerative torque according to braking operation take place at the same time.

More specifically, the electronic control unit 50 further includes a regeneration change rate determining means, or a regeneration change rate determining unit 58.

The regeneration change rate determining unit 58 determines whether the rate of change of regenerative torque is within a predetermined range. More specifically, when the shift controller 54 determines a downshift of the automatic transmission 20 during coasting, the regeneration change rate determining unit 48 calculates the rate of change of requested regenerative torque (which will be called "regeneration change rate") according to braking operation. For example, the regeneration change rate determining unit 58 calculates the regeneration change rate, based on a difference between a signal value of the current requested regenerative torque and a signal value of requested regenerative torque obtained in the last cycle, in a control cycle or routine (see the flowchart of FIG. 6 which will be described later) that is repeatedly executed. The regeneration change rate determining unit 58 determines whether the regeneration change rate is within the predetermined range, based on whether the calculated regeneration change rate (its absolute value) is smaller than a predetermined value. The above-indicated predetermined range is a predetermined range of regeneration change rate in which the regeneration change rate is small enough to cause no deterioration of shock at the time of shifting. The above-indicated predetermined value is a threshold value based on which it is determined whether the regeneration change rate is within the predetermined range, and is set to the lower limit of regeneration change rate determined in advance as being large enough to deteriorate shift shock. The degree of shift shock may vary depending on which gear position to which the automatic transmission 20 is to be shifted down. Therefore, the above-indicated predetermined range and the above-indicated predetermined value may be determined in advance for each gear position of the automatic transmission 20 (for example, for each gear position to which the automatic transmission is shifted down).

When the shift controller 54 determines a downshift of the automatic transmission 20 (i.e., determines that the automatic transmission 20 should be shifted down) during coasting, it executes the downshift thus determined, under a condition that the regeneration change rate determining unit 58 determines that the regeneration change rate is within the predetermined range. More specifically, if the regeneration change rate determining unit 58 determines that the regeneration change rate is not within the predetermined range when the shift controller 54 determines a downshift of the automatic transmission 20 during coasting, the shift controller 54 does not execute the downshift thus determined, until the regeneration change rate determining unit 58 determines that the regeneration change rate is within the predetermined range. Namely, if the regeneration change rate determining unit 58 determines that the regeneration change rate is not within the predetermined range when the shift controller 54 determines a downshift of the automatic transmission 20 during coasting, the shift controller 54 delays output of a hydraulic control command signal Sp in response to a downshift command for executing the downshift thus determined. If the regeneration change rate determining unit 58 determines that the regeneration change rate is within the predetermined range when the shift controller 54 determines a downshift of the automatic transmission 20 during coasting, the shift controller 54 outputs a hydraulic control command signal Sp in response to the downshift command, or cancels or stops delaying of output of the hydraulic control command signal Sp in response to the downshift command.

Figure 6:
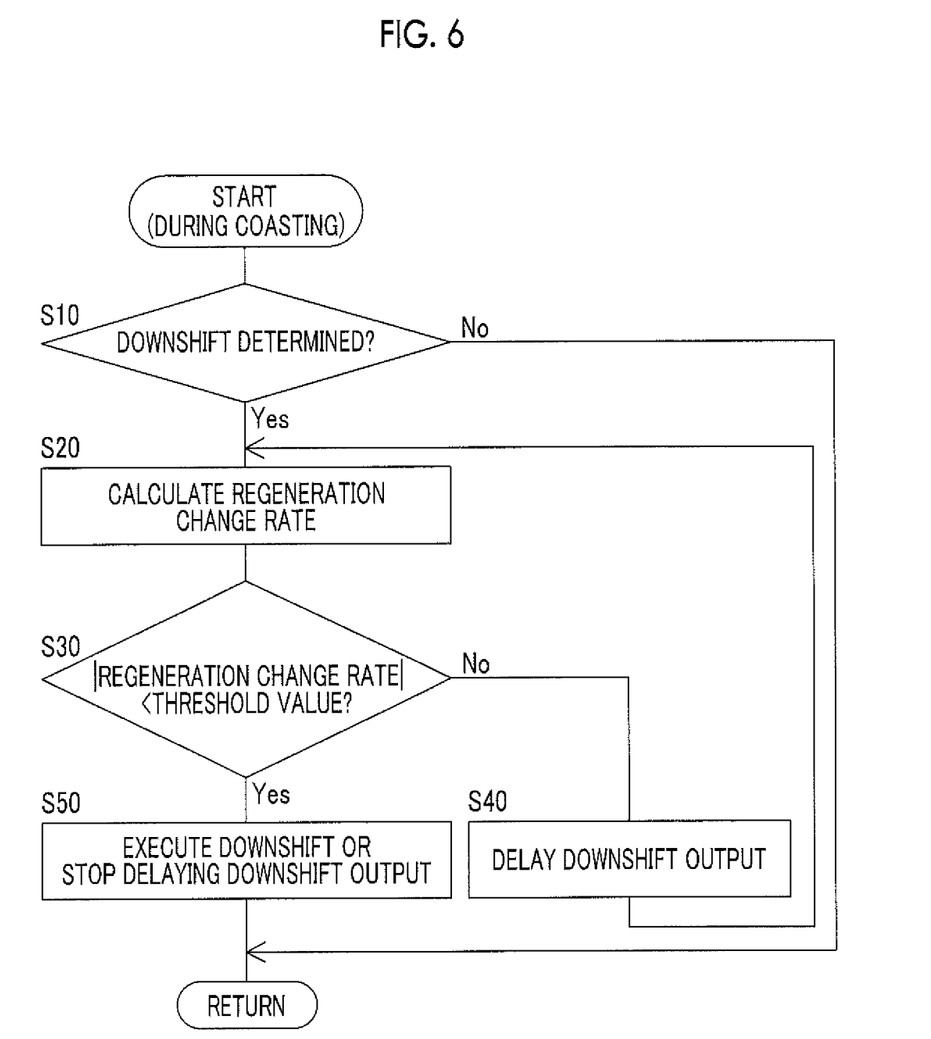
FIG. 6 is a flowchart illustrating a principal part of control operation of an electronic control unit, namely, control operation for curbing deterioration of shift shock when a downshift of the automatic transmission during coasting and increase of regenerative torque take place at the same time.
Figure 7:
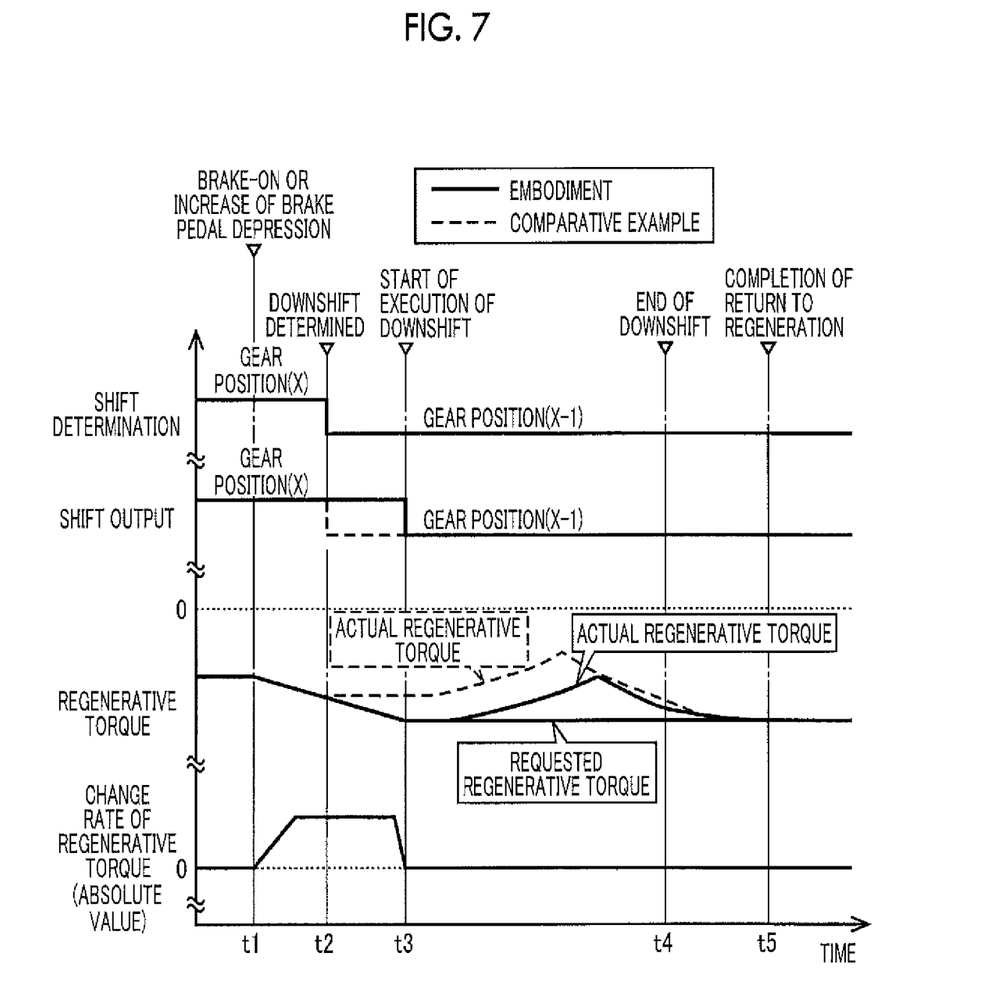
FIG. 7 is one example of a time chart when the control operation illustrated in the flowchart of FIG. 6 is performed.

FIG. 6 is a flowchart illustrating a principal part of control operation of the electronic control unit 50, namely, control operation for curbing deterioration of shift shock when a downshift of the automatic transmission 20 during coasting and increase of regenerative torque caused by braking operation take place at the same time. The control routine of FIG. 6 is repeatedly executed during coasting, for example. FIG. 7 is one example of a time chart when the control operation illustrated in the flowchart of FIG. 6 is performed.

In FIG. 6, it is initially determined in step S10 corresponding to a function of the shift controller 54 whether the automatic transmission 20 should be shifted down during coasting. If a negative decision (NO) is obtained in step S10, this routine ends. If an affirmative decision (YES) is obtained in step S10, the regeneration change rate is calculated, in step S20 corresponding to a function of the regeneration change rate determining unit 58. Then, in step S30 corresponding to a function of the regeneration change rate determining unit 58, it is determined whether the regeneration change rate (its absolute value) calculated in the above step S20 is smaller than a predetermined value (threshold value) (namely, whether the regeneration change rate is within a predetermined range). If a negative decision (NO) is obtained in step S30, output of a hydraulic control command signal Sp in response to a downshift command for executing the downshift determined in step S10 is delayed, in step S40 corresponding to a function of the shift controller 54. Then, the control returns to step S20. On the other hand, if an affirmative decision (YES) is obtained in the above step S30, a hydraulic control command signal Sp is generated in response to the downshift command for executing the downshift determined in the above step S10, in step S50 corresponding to a function of the shift controller 54. Alternatively, delaying output of the hydraulic control command signal Sp in response to the downshift command, which was performed in the above step S40, is cancelled or stopped.

In FIG. 7, at time t1, the brake pedal is depressed (i.e., the vehicle switches from "brake-off" state to "brake-on" state), or the braking operation amount is increased (e.g., the brake pedal is depressed by an additional degree) while the vehicle is in the "brake-on" state, during coasting. As a result, the requested regenerative torque is increased from time t1, and the actual regenerative torque is also increased. With the regenerative torque thus increased, a downshift of the automatic transmission 20 is determined (see time t2). While the rate of change of regenerative torque (equivalent to "regeneration change rate") is large, no shift command for executing the downshift thus determined is generated (from time t2 to time t3). After the rate of change of regenerative torque (equivalent to "regeneration change rate") is reduced, and the requested regenerative torque is stabilized, a shift command for executing the downshift thus determined is generated (see time t3). During downshifting of the automatic transmission 20, torque phase compensation control is performed so that the actual regenerative torque is reduced to be smaller than requested regenerative torque, for reduction of shift shock, and well-known control for reducing the actual regenerative torque is also performed during the inertia phase (from time t3 to time t4). After the downshift is completed, the actual regenerative torque is slowly increased so that the requested regenerative torque is obtained (from time t4 to time t5). In a comparative example indicated by broken lines in FIG. 7, when the requested regenerative torque increases, the actual regenerative torque is not caused to follow the requested regenerative torque from the time when a downshift is determined, and increase of the actual regenerative torque is restricted. Thus, the downshift is executed in a condition where the actual regenerative torque is stable, immediately after the downshift is determined, so that deterioration of shift shock is curbed. Also, in this comparative example, too, torque compensation control is performed, as in this embodiment, during downshifting of the automatic transmission 20, and the control for reducing the actual regenerative torque during the inertia phase is further performed. In this comparative example, deterioration of shift shock can be curbed, but a deviation of the actual regenerative torque from the requested regenerative torque becomes large, resulting in poor regeneration efficiency. More specifically, since the absolute value of the actual regenerative torque is smaller than the absolute value of the requested regenerative torque for a prolonged period of time, the regeneration efficiency is reduced. In this embodiment, deterioration of shift shock can be curbed substantially equally, relative to the comparative example; furthermore, the actual regenerative torque is caused to follow the requested regenerative torque in a condition where the regeneration change rate is large, so that the regeneration efficiency can be improved. Namely, according to the shift map shown in FIG. 5, a downshift is determined with high frequency immediately after braking operation (for example, depression of the brake pedal), and the regenerative torque is deemed highly likely to be kept increased. If the control for restricting increase of the regenerative torque is performed, as in the comparative example, the regeneration efficiency may deteriorate, and the fuel efficiency may deteriorate. In order to achieve both improvement of the fuel efficiency and reduction of shock, it is necessary to delay downshift output (i.e., execution of the downshift) as in this embodiment. This embodiment is concerned with a technology for dealing with the situation where a downshift during coasting and increase of regenerative torque take place at the same time, and this technology is different from a technology for preventing busy or frequent change of gears or gearshifts, or improving the driveability at the time of re-acceleration by keeping a low gear position, as in the case where upshift output (execution of an upshift) is inhibited when the upshift is determined in response to release of the accelerator pedal during acceleration.

As described above, according to this embodiment, when a downshift of the automatic transmission 20 is determined during coasting, the downshift is carried out under the condition that the regeneration change rate is within the predetermined range; therefore, the downshift is performed in a stable condition where change of the regenerative torque is small. Thus, when downshift of the automatic transmission 20 during coasting and increase of regenerative torque caused by braking operation take place at the same time, deterioration of shift shock can be curbed.

Also, according to this embodiment, when the regeneration change rate at the time when a downshift of the automatic transmission 20 is determined during coasting is not within the predetermined range, the downshift is not carried out until the regeneration change rate falls within the predetermined range; therefore, no downshift is performed in a condition where change of regenerative torque is large, and deterioration of shift shock is curbed.

Also, according to this embodiment, regenerative torque produced according to braking operation is requested regenerative torque, and the regeneration change rate is the rate of change of the requested regenerative torque; therefore, no downshift of the automatic transmission 20 is carried out, while the requested regenerative torque is increasing such that the regeneration change rate is not within the predetermined range. Accordingly, there is no need to perform control (e.g., torque phase compensation control) for reducing shift shock, during increase of the requested regenerative torque, thus making it easy to obtain actual regenerative torque that meets or follows the requested regenerative torque. Consequently, reduction of regenerative energy is curbed.

Also, according to this embodiment, the predetermined range is determined in advance for each gear position of the automatic transmission 20. Therefore, where the degree of occurrence of shift shock differs depending on the gear position of the automatic transmission 20, downshift of the automatic transmission 20 is performed in accordance with the degree of occurrence. Namely, if downshift is not carried out even though shift shock is unlikely to occur, completion of the downshift may be delayed. If downshift is carried out even though shift shock is likely to occur, the shock may deteriorate. These situations are less likely or unlikely to occur according to this embodiment.

While one embodiment of the present disclosure has been described in detail with reference to the drawings, the present disclosure may be applied in other forms.

Figure 8:
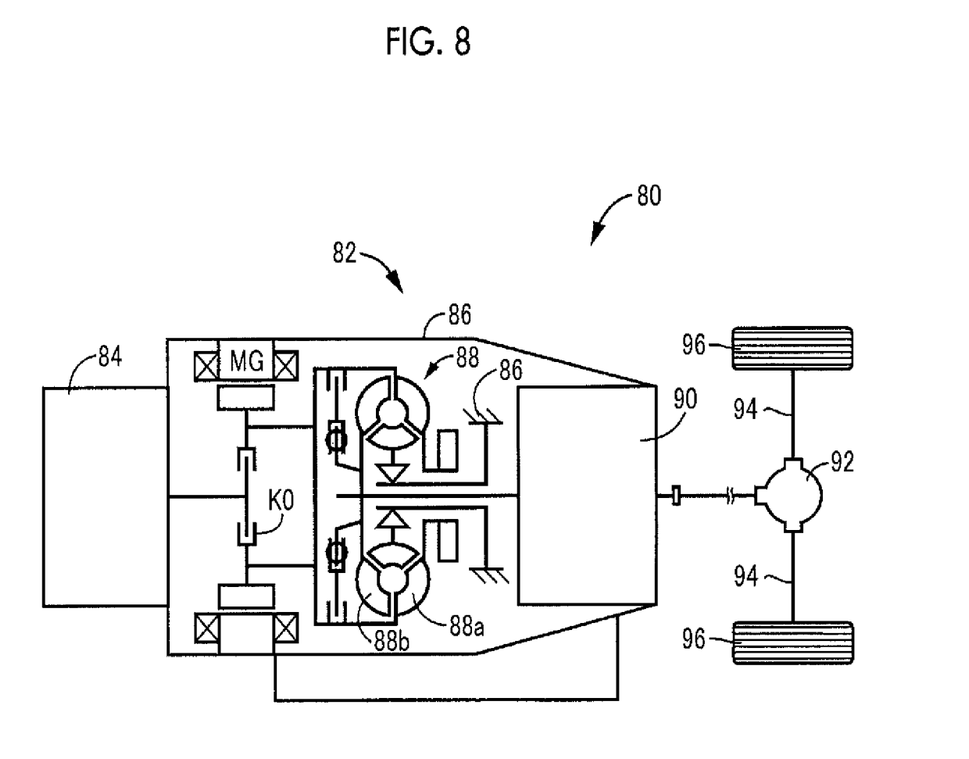
FIG. 8 is a view schematically showing the configuration of a power transmission system included in a vehicle to which the present disclosure is applied, and is also a view useful for explaining another power transmission system different from that of FIG. 1.

In the above-described embodiment, the power transmission system 12 includes the electric continuously variable transmission 30 and the automatic transmission 20 arranged in series. However, the power transmission system of the present disclosure is not limited to this arrangement, but may be a power transmission system 82 included in a vehicle 80 as shown in FIG. 8, for example. In FIG. 8, the vehicle 80 is a hybrid vehicle including an engine 84 and an electric motor MG as a motor for running the vehicle. The power transmission system 82 includes a clutch KO, torque converter 88, automatic transmission 90 as a mechanical speed change mechanism, etc., arrange in this order as seen from the engine 84 side, in a case 86 as a non-rotating member. The power transmission system 82 also includes a differential gear unit 92, axles 94, etc. A pump impeller 88a of the torque converter 88 is coupled to the engine 84 via the clutch KO, and is also directly coupled to the motor MG. A turbine wheel 88b of the torque converter 88 is directly coupled to the automatic transmission 90. In the power transmission system 82, power of the engine 84 and/or power of the motor MG is transmitted to drive wheels 96, via the clutch KO (when power of the engine 84 is transmitted), torque converter 88, automatic transmission 90, differential gear unit 92, axles 94, etc. The automatic transmission 90 is a planetary gear type automatic transmission. In sum, the present disclosure may be applied to any type of power transmission system provided that it includes a mechanical speed change mechanism that provides a part of a power transmission path between an electric motor for running the vehicle and drive wheels. While the torque converter 88 is used as a hydraulic power transmission device in the vehicle 80, another type of hydraulic power transmission device, such as a fluid coupling having no torque amplifying function, may also be used. Also, the torque converter 88 is not necessarily provided, or it may be replaced with a simple clutch.

In the above-described embodiment, the automatic transmission 20 in the form of the planetary gear type automatic transmission is illustrated by way of example as the mechanical speed change mechanism that provides a part of the power transmission path between the second motor MG2 and the drive wheels 18. However, the mechanical speed change mechanism is not limited to this type of transmission. For example, the mechanical speed change mechanism may be a known synchromesh parallel two-axis type transmission including a plurality of pairs of shift gears that constantly mesh with each other, between two axes. More specifically, the mechanical speed change mechanism may be a synchromesh parallel two-axis type automatic transmission as one type of synchromesh parallel two-axis type transmission, in which engagement and release of dog clutches (i.e., mesh-type clutches) are controlled by actuators, so that the gear position is automatically changed, or a known DCT (Dual Clutch Transmission) as one type of synchromesh parallel two-axis type automatic transmission, which has input shafts on two systems or lines. The mechanical speed change mechanism may also be a known continuously variable transmission (CVT). These types of transmissions may also be used as the automatic transmission 90.

In the above-described embodiment, as one example of the case where a downshift of the automatic transmission 20 is carried out during increase of regenerative torque, the case where a downshift of the automatic transmission 20 is determined when the requested regenerative torque is increased according to braking operation during coasting of the vehicle 10 (see arrow C in FIG. 5) has been illustrated by way of example. However, the present disclosure is not limited to this arrangement. For example, it may be the case where the requested regenerative torque is increased according to braking operation, at substantially the same time that or immediately after a downshift of the automatic transmission 20 is determined in response to reduction of the vehicle speed V. In sum, the present disclosure may be applied provided that the vehicle is in a traveling state in which a downshift of the automatic transmission 20 during coasting and increase of regenerative torque caused by braking operation take place at the same time.

In the above-described embodiment, the regenerative torque produced according to braking operation is the requested regenerative torque that is increased as the braking operation amount is larger, and the regeneration change rate is the rate of change of the requested regeneration torque. However, the present disclosure is not limited to this example. For example, the rate of change of the actual regenerative torque may be used as the regeneration change rate, since the actual regenerative torque is caused to follow the requested regenerative torque until a downshift of the automatic transmission 20 determined is actually carried out.

While the power distribution mechanism 16 is a single planetary gear set in the above-described embodiment, it may be a double planetary gear set. Also, the power distribution mechanism may be a differential gear device having a pinion that is rotated/driven by the engine, and a pair of bevel gears that mesh with the pinion. The bevel gears are operatively coupled to the first motor MG1 and the transmission member 32 (the second motor MG2). Also, the power distribution mechanism 16 may be a mechanism in which two or more planetary gear sets are coupled to each other with a part of rotating elements that constitutes the gear sets, and the engine, motor, and the drive wheels are respectively coupled to the corresponding rotating elements of the planetary gear sets such that power can be transmitted therebetween. Also, the power distribution mechanism 16 may be a mechanism that is operated as a transmission having at least two gear positions, such that its differential operation is restricted through control of a clutch(es) or a brake(s) coupled to the rotating elements of the planetary gear set.

While brake pedal operation is indicated as an example of braking operation, the present disclosure is not limited to this example. For example, in a deceleration control device that can set a target deceleration, the braking operation may be operation to set a deceleration during coasting. In a shift control device having a plurality of shift positions that are switched through manipulation by a driver or operator, the braking operation may be shift lever operation through which the gear position of the automatic transmission 20 is changed in a manual shift mode during coasting.

It is to be understood that the above-described embodiment is a mere example, and that the present disclosure may be embodied with various changes or improvements, based on the knowledge of those skilled in the art.

What is claimed is:

1. A control system of a power transmission system of a vehicle, the power transmission system including an electric motor for running the vehicle, and a mechanical speed change mechanism, the mechanical speed change mechanism providing a part of a power transmission path between the electric motor and drive wheels, the control system comprising:
   an electronic controller including a central processing unit (CPU) and a memory;
   the electronic controller being configured to:
   perform regeneration control of the electric motor during a coasting of the vehicle, such that regenerative torque of the electric motor provides regenerative torque produced according to a braking operation;
   perform shift control of the mechanical speed change mechanism according to a predetermined shift map;
   determine whether a rate of change of the regenerative torque is within predetermined range;
   execute a downshift under a condition that the downshift of the mechanical speed change mechanism is determined by the electronic controller during the coasting and the electronic controller determines that the rate of change of the regenerative torque is within the predetermined range; and
   when the electronic controller determines that the rate of change of the regenerative torque is not within the predetermined range and when the downshift of the mechanical speed change mechanism is determined by the electronic controller during the coasting, the electronic controller does not execute the downshift until the electronic controller determines that the rate of change of the regenerative torque is within the predetermined range.

2. The control system of the power transmission system of the vehicle according to claim 1, wherein the regenerative torque produced according to the braking operation is a requested regenerative torque that is increased as a braking operation amount is increased, and the rate of change of the regenerative torque is a rate of change of the requested regenerative torque.

3. The control system of the power transmission system of the vehicle according to claim 1, wherein the mechanical speed change mechanism is an automatic transmission that is configured to be shifted into a selected gear position of a plurality of gear positions, through engagement and release of at least one engagement device.

4. The control system of the power transmission system of the vehicle according to claim 3, wherein the predetermined range is determined in advance for each gear position of the automatic transmission.

5. The control system of the power transmission system of the vehicle according to claim 1, wherein the power transmission system further includes an electric speed change mechanism, the electric speed change mechanism includes a differential mechanism and an electric motor for differential operation, the differential mechanism is coupled to an engine such that power is transmitted between the differential mechanism and the engine, the electric motor for differential operation is coupled to the differential mechanism such that power is transmitted between the electric motor for differential operation and the differential mechanism, the electronic controller is configured to control an operating state of the electric motor for differential operation so as to control a differential state of the differential mechanism, the electric motor is coupled to an output rotating member of the electric speed change mechanism such that power is transmitted between the electric motor and the output rotating member, and an input rotating member of the mechanical speed change mechanism is coupled to the output rotating member of the electric speed change mechanism.

* * * * *